(12) United States Patent
Chen

(10) Patent No.: US 8,536,477 B2
(45) Date of Patent: Sep. 17, 2013

(54) SLIDE CONTROL KEY WITH ELASTIC RETURN

(75) Inventor: Jian-Hui Chen, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 158 days.

(21) Appl. No.: 13/220,871

(22) Filed: Aug. 30, 2011

(65) Prior Publication Data

US 2012/0186959 A1   Jul. 26, 2012

(30) Foreign Application Priority Data

Jan. 20, 2011   (CN) .......................... 2011 1 0022917

(51) Int. Cl.
*H01H 3/00*   (2006.01)

(52) U.S. Cl.
USPC .......................................... 200/329

(58) Field of Classification Search
USPC ............................. 200/329, 547; 361/679.57
See application file for complete search history.

(56) References Cited

U.S. PATENT DOCUMENTS

| 6,313,420 | B1 * | 11/2001 | Ohashi ........................ 200/302.1 |
| 6,841,744 | B1 * | 1/2005 | Kodo et al. .................... 200/16 C |
| 7,208,692 | B2 * | 4/2007 | Yamaguchi .................... 200/547 |
| 7,679,017 | B1 * | 3/2010 | Tsai ................................ 200/547 |
| 7,916,459 | B2 * | 3/2011 | Lee et al. ................. 361/679.01 |
| 8,003,908 | B2 * | 8/2011 | Zuo ............................. 200/332.1 |
| 2008/0264768 | A1 * | 10/2008 | Shi et al. ....................... 200/344 |

* cited by examiner

*Primary Examiner* — Vanessa Girardi
(74) *Attorney, Agent, or Firm* — Altis Law Group, Inc.

(57) ABSTRACT

A control assembly for an electronic device includes a housing, a control key, and an elastic member. The housing defines a groove. The control key is slidably positioned in the groove. The elastic member includes a plate portion and at least one elastic arm. The control key brings the elastic member to move to contact a switch, and the at least one elastic arm provides a return force to return the control key.

19 Claims, 5 Drawing Sheets

SLIDE CONTROL KEY WITH ELASTIC RETURN

BACKGROUND

1. Technical Field

The present disclosure relates to control assemblies, particularly to a control assembly for locking a touch screen used in an electronic device.

2. Description of Related Art

Touch screens are well known in the art to provide a means for displaying graphics and text in electronic devices and to provide an input means to enter commands to control the device or to perform various other functions to carry out the operation of the device. Electronic device such as cellular telephones, may include touch screen displays. The virtual keys on a touch screen are touched to control the phone and to carry out various desired phone functions, for example, increasing or decreasing the listening volume, starting or ending a call, accessing speed dialing, or other various features.

One problem generally associated with the use of touch screen displays in mobile telephones, is the accidental input of commands during calls when handling the phone.

Therefore, there is room for improvement within the art.

BRIEF DESCRIPTION OF THE DRAWINGS

Many aspects of the control assembly can be better understood with reference to the following drawings. The components in the drawings are not necessarily drawn to scale, the emphasis instead being placed upon clearly illustrating the principles of the control assembly. Moreover, in the drawings, like reference numerals designate corresponding parts throughout the several views.

DETAILED DESCRIPTION

The disclosed control assembly may be used for locking a touch screen of portable electronic devices such as mobile phones or personal digital assistants (PDA) in accordance with an exemplary embodiment. In the exemplary embodiment, the control assembly used in a mobile phone is illustrated, although the disclosure is not limited thereto.

Figure 1:
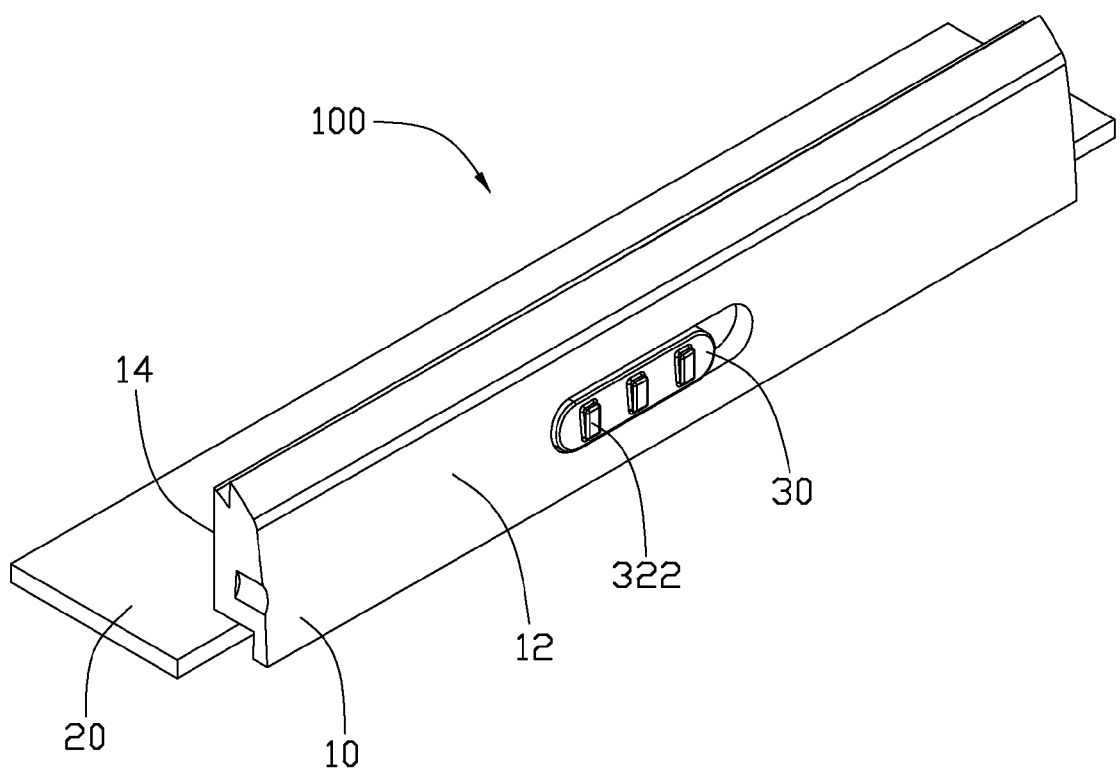
FIG. 1 is a schematic view of a portion of a portable electronic device using a control assembly in accordance with an exemplary embodiment.
Figure 2:
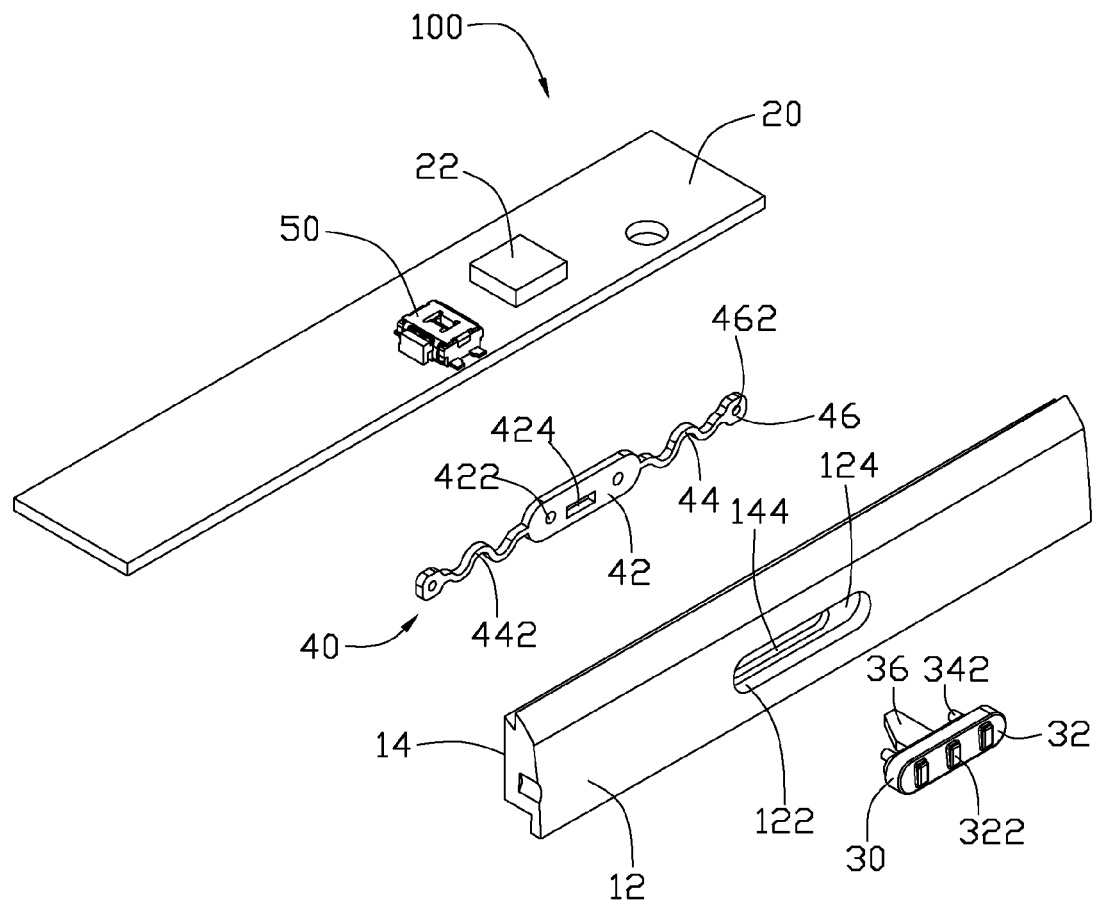
FIG. 2 is an exploded view of the portable electronic device of FIG. 1.
Figure 3:
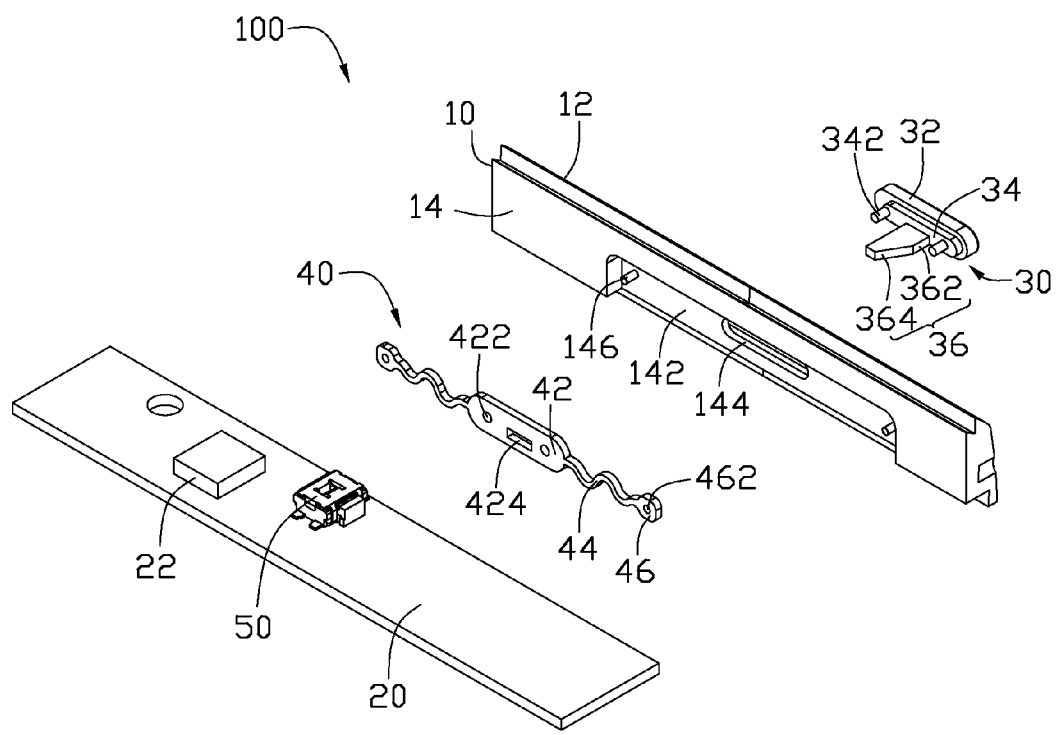
FIG. 3 is similar to FIG. 2, showing another aspect.

FIGS. 1 to 3 show a portable electronic device 100 including a housing 10, a printed circuited board (PCB) 20, a control key 30, an elastic member 40, and a switch 50.

The housing 10 (only a portion of which is shown) includes a first surface 12 and a second surface 14 opposite to each other. The first surface 12 defines a groove 122 and an opening 144 communicating with each other. The groove 122 is longer and wider than the opening 144. The control key 30 abuts against a bottom 124 of the groove 122. The second surface 14 defines a recess 142, and the opening 144 is positioned at a central area of the recess 142. Two posts 146 are formed at opposite ends of the recess 142 for fixing the elastic member 40 to the housing 10.

The PCB 20 is received in the housing 10. A central processing unit (CPU) 22 is disposed on the PCB 20. The CPU 22 is used for, among other things, executing unlocking instructions or locking instructions to activate and deactivate the touch screen.

The control key 30 includes a main portion 32, a connecting portion 34, and a pressing portion 36. The main portion 32 is received in the groove 122, and can slide relative to the bottom 124. A plurality of ribs 322 are formed on the main portion 32 for conveniently operating the control key 30. The connecting portion 34 is disposed at one side of the main portion 32 opposite to the ribs 322, and can be slidably received in the opening 144. Two guiding pins 342 are formed at opposite ends of the connecting portion 34. The pressing portion 36 perpendicularly extends from the connecting portion 34, and includes a connecting end 362 and a resisting end 364 integrally formed together. The connecting end 362 is connected to the connecting portion 34. The resisting end 364 is substantially wedge-shaped, and is narrower than the connecting end 362.

The elastic member 40 is received in the recess 142, and secured to the control key 30. The elastic member 40 is made of plastic, and includes a plate portion 42, two elastic arms 44 and two holding portions 46 integrally formed together. The plate portion 42 defines two first latching holes 422 and a cutout 424 therebetween. The guiding pins 342 can be latched in the first latching holes 422 to fix the elastic member 40 to the control key 30. In this exemplary embodiment, the plate portion 42 is further secured to the control key 30 by hot melting. The size of the cutout 424 corresponds to the pressing portion 36. When the elastic member 40 is assembled to the recess 142, the cutout 424 is aligned with the opening 144. The elastic arms 44 are connected to opposite sides of the plate portion 42. Each elastic arm 44 includes a plurality of energy absorbing portions 442. The energy absorbing portions 442 may be wave-shaped or compression springs or the like. When the control key 30 slides, the plate portion 42 is forced to move toward one side relative to the housing 10 and the energy absorbing portions 442 at the side the plate is moved towards deforms to accumulate potential elastic energy. Each holding portion 46 defines a second latching hole 462 for latching a corresponding post 146 to fix the elastic member 40 to the housing 10. In this exemplary embodiment, the holding portions 46 are further secured to the housing 10 by hot melting.

The switch 50 is a press-touch switch, and is disposed on the PCB 20 adjacent to the control key 30. The switch 50 is electrically connected to the CPU 22 so that when the control key 30 is touched, the switch 30 sends a signal to the CPU 22 for performing an unlocking action or a locking action.

Figure 4:
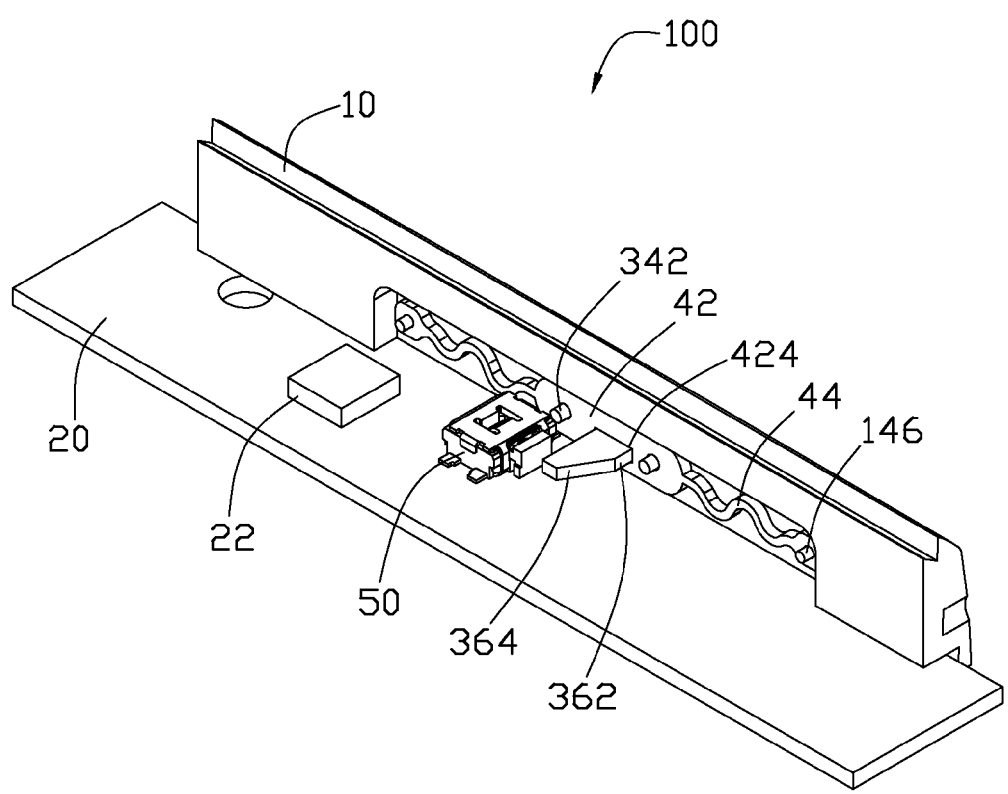
FIG. 4 is similar to FIG. 1, showing another aspect.

Referring to FIG. 4, during assembly, the control key 30 is received in the groove 122. The elastic member 40 is placed to the recess 142. The guiding pins 342 are fixed in the first latching holes 422, and the posts 146 are fixed in the second latching holes 462 by hot melting. The pressing portion 36 extends through the opening 144 and the cutout 424. The connecting end 362 is latched in the cutout 424, and the resisting end 364 is adjacent to the switch 50.

In use, the control key 30 is slid in the groove 122, for example by using ribs 322 toward a direction. The movement of the control key 30 causes the pressing portion 36 to move until the pressing portion 36 abuts the switch 50. The switch 30 sends a signal to the CPU 22 for performing an unlocking action or a locking action. Since the plate portion 42 is fixed to the connecting portion 34, and the holding portions 36 are fixed to the housing 10, one of the elastic arms 44 is compressed, and the other of the elastic arms 44 is stretched. After the control key 30 is released, the elastic arms 44 release their potential energy and return the control key 30 to an original state.

Figure 5:
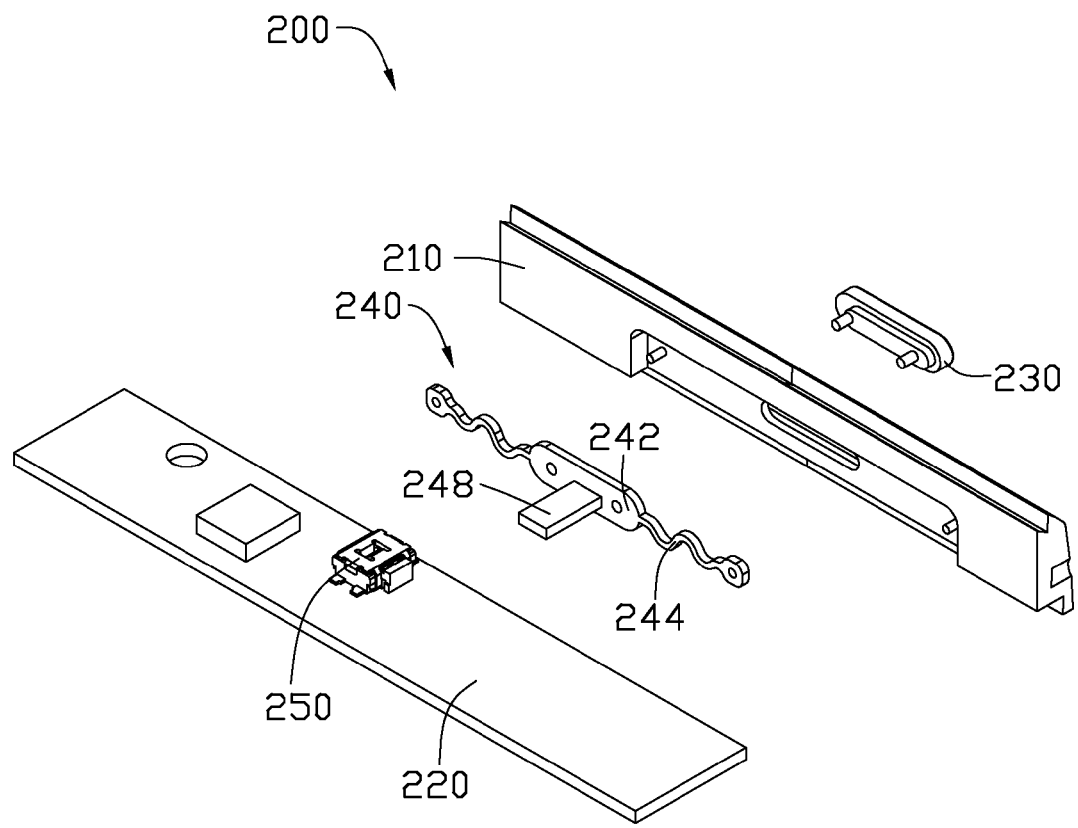
FIG. 5 is an exploded view of the portable electronic device in accordance with another exemplary embodiment.

Referring to FIG. 5, the portable electronic device 200 in another exemplary embodiment, includes a housing 210, a PCB 220, a control key 230, an elastic member 240, a first switch 250, and a second switch 260. The portable electronic device 200 is basically similar to the device 100 of the first exemplary embodiment. The main difference is that the control key 230 lacks the pressing portion 36. The elastic member 240 includes a plate portion 242 and two elastic arms 244. A pressing block 248 is formed on the plate portion 242. An elastic block 238 is formed on the control key 230 for elastically pressing the plate portion 242. The control key 230 is slidably attached to the elastic member 240, and may be pressed along a first direction perpendicular to the housing 210. The elastic arms 244 are stretched, and the pressing block 248 is moved into contact with the second switch 260. The control key 230 may be slid along the groove of the housing 210 in a second direction to contact the first switch 250. The present disclosure may easily lock or unlock the touch screen of the mobile phone to prevent accidental or unintentional operation during an ongoing call.

It is to be understood, however, that even through numerous characteristics and advantages of the present disclosure have been set forth in the foregoing description, together with details of assembly and function, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A control assembly for an electronic device, comprising:
a housing defining a groove and an opening communicating with each other,
a control key including a main portion and a connecting portion, the main portion being received in the groove, the connecting portion being disposed at one side of the main portion and slidably received in the opening, two guiding pins formed at opposite ends of the connecting portion;
an elastic member including a plate portion and at least one elastic arm, the two guiding pins fix onto the plate portion of the elastic member, the control key causing the elastic member to move to contact a switch, the at least one elastic arm providing a return force to return the control key to a rest position.

2. The control key assembly as claimed in claim 1, wherein the control key includes a pressing portion perpendicularly extending from the connecting portion, and includes a connecting end and a resisting end integrally formed together, the connecting end is connected to the connecting portion, and the resisting end is narrower than the connecting end.

3. An electronic device comprising:
a housing defining a groove at a first side and defining a recess at a second side; and
a control key slidably positioned in the groove, the control key including a pressing portion;
an elastic member including a plate portion and two elastic arms, the plate portion defining a cutout, the pressing portion extending through the cutout, the two elastic arms being positioned at opposite ends of the plate portion, the plate portion and the two elastic arms being received in the recess, the control key causing the elastic member to move, the elastic arms providing a return force to return the control key; and
a switch, the pressing portion of the control key touching the switch for performing an unlocking action or a locking action for a touch screen.

4. The electronic device as claimed in claim 3, wherein the housing defines an opening communicating with each other, the control key includes a main portion and a connecting portion, the main portion is received in the groove, the connecting portion is disposed at one side of the main portion, and is slidably received in the opening, and two guiding pins are formed at opposite ends of the connecting portion for fixing the connecting portion onto the plate portion of the elastic member.

5. The electronic device as claimed in claim 3, wherein the housing defines a groove and an opening communicating with each other, and the groove is longer and wider than the opening.

6. The electronic device as claimed in claim 5, wherein the opening is positioned at a central area of the recess, and two posts are formed at opposite ends of the recess for fixing the elastic member to the housing.

7. The electronic device as claimed in claim 6, wherein the control key includes a main portion and a connecting portion, the main portion is received in the groove, the connecting portion is disposed at one side of the main portion, and is slidably received in the opening.

8. The electronic device as claimed in claim 7, wherein two guiding pins are formed at opposite ends of the connecting portion for fixing onto the plate portion of the elastic member.

9. The electronic device as claimed in claim 7, wherein the pressing portion perpendicularly extends from the connecting portion, and includes a connecting end and a resisting end integrally formed together, the connecting end is connected to the connecting portion, and the resisting end is narrower than the connecting end.

10. A control assembly for an electronic device, comprising:
a housing defining a groove, one side the housing defining the groove and an opening communicating with each other, the groove being longer and wider than the opening;
a control key including a main portion and a connecting portion, the main portion being received in the groove, the connecting portion being disposed at one side of the main portion and slidably received in the opening;
an elastic member including a plate portion and at least one elastic arm, the control key causing the elastic member to move to contact a switch, the at least one elastic arm providing a return force to return the control key to a rest position;
wherein two guiding pins are formed at opposite ends of the connecting portion for fixing the connecting portion onto the plate portion of the elastic member.

11. The control key assembly as claimed in claim 10, wherein the control key includes a pressing portion perpendicularly extending from the connecting portion, and includes a connecting end and a resisting end integrally formed together, the connecting end is connected to the connecting portion, and the resisting end is narrower than the connecting end.

12. The control key assembly as claimed in claim 10, wherein another side of the housing defines a recess, and the opening is positioned at a central area of the recess.

13. The control key assembly as claimed in claim 12, wherein two posts are formed at opposite ends of the recess for fixing the elastic member to the housing.

14. The control key assembly as claimed in claim 10, wherein the elastic member comprises two elastic arms and two holding portions, and the elastic arms are connected to opposite sides of the plate portion.

15. The control key assembly as claimed in claim 14, wherein each elastic arm includes a plurality of energy absorbing portions.

16. The control key assembly as claimed in claim 15, wherein the energy absorbing portions are wave-shaped.

17. The electronic device as claimed in claim 3, wherein the elastic member including two holding portions, and the holding portions and the elastic arms are connected to opposite sides of the plate portion.

18. The electronic device as claimed in claim 17, wherein each elastic arm includes a plurality of energy absorbing portions.

19. The electronic device as claimed in claim 18, wherein the energy absorbing portions are wave-shaped.

* * * * *